United States Patent
Harbison et al.

[11] Patent Number: 6,015,765
[45] Date of Patent: Jan. 18, 2000

[54] RARE EARTH SOLUBLE TELLURIDE GLASSES

[75] Inventors: Barry B. Harbison, Dunkirk; Jasbinder S. Sanghera, Greenbelt; L. Brandon Shaw, Laurel, all of Md.; Ishwar D. Aggarwal, Fairfax Station, Va.

[73] Assignee: The United States of America as represented by the Secretary of the Navy, Washington, D.C.

[21] Appl. No.: 08/997,800

[22] Filed: Dec. 24, 1997

[51] Int. Cl.[7] .............................. C03C 3/32; C03C 13/04
[52] U.S. Cl. .................................................. 501/40; 501/37
[58] Field of Search .......................................... 501/40, 37

[56] References Cited

U.S. PATENT DOCUMENTS

| | | | |
|---|---|---|---|
| 3,343,972 | 9/1967 | Hilton et al. | 501/40 |
| 3,920,461 | 11/1975 | Asahara et al. | 501/40 |
| 4,154,503 | 5/1979 | Lettington et al. | |
| 4,492,763 | 1/1985 | Trotta et al. | 501/40 |
| 4,704,371 | 11/1987 | Krolla et al. | 501/40 |
| 4,942,144 | 7/1990 | Martin | 501/40 |
| 5,352,639 | 10/1994 | Lucas et al. | 501/40 |
| 5,779,757 | 7/1998 | Sanghera et al. | 501/40 |

*Primary Examiner*—Mark L. Bell
*Assistant Examiner*—David Sample
*Attorney, Agent, or Firm*—Barry A. Edelberg; George A. Kap

[57] ABSTRACT

A telluride glass with glass transition temperature above 150° C., difference between the crystallization temperature and the glass transition temperature of above 200° C., and extended transmission in the infrared region of radiation of up to 20 microns having, on mol basis, 20–60% tellurium, 10–50% arsenic, 4–35% germanium, 0.5–15% gallium, up to 15% iodine, and up to 30% selenium. All or part of the gallium can be replaced with indium and the glass can contain up to 5%, based on the weight of the glass components, of a rare earth ion to render the glass fluorescent. Optical fibers drawn from these glasses have shown mid infrared fluorescence and may have as a bright source of IR light.

20 Claims, 4 Drawing Sheets

RARE EARTH SOLUBLE TELLURIDE GLASSES

BACKGROUND OF INVENTION

1. Field of Invention

This invention relates to infrared transparent glasses containing tellurium which have solubility for rare-earth ions.

2. Description of Prior Art

Infrared transmitting materials are known and comprise a variety of different materials including crystalline halides, silica and fluoride glasses, and chalcogenide glasses. Crystalline halides undergo plastic deformation and are hygroscopic, requiring cumbersome containment apparatus for IR systems applications. Laser glasses have been developed as host materials for rare earth ions but mainly for applications operating at wavelengths less than 3 microns. Silicate and fluoride glasses have been developed as optical fiber amplifiers but are limited by their high phonon energies relative to chalcogenide glasses. It is widely recognized that longer emission lifetimes and hence, higher efficiencies, are achieved with lower phonon energy host materials for rare earth ions. The class of chalcogenide glasses includes sulfides, selenides and tellurides, respectively, with increasing mass and weaker bonding strength. With increasing mass and lower bonding energy, the glasses transmit to longer wavelengths due to the lower phonon energies. Sulfide glasses are well known and Harbison et al. in U.S. Pat. No. 5,599,751, herein incorporated by reference, describe an infrared transmitting germanium sulfide glass that would tolerate the addition of rare earth ions in the glass.

Telluride glasses have been based upon As—Te and/or Ge—Te compositions. Glasses based upon As—Te and/or Ge—Te lack the ability to dissolve rare earth ions. Martin in U.S. Pat. No. 4,942,144 teaches that chalcogenide IR transmitting glasses can be made with the following formula:

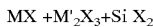

$MX + M'_2X_3 + Si\,X_2$ where M represents a metal selected from calcium, strontium, barium, zinc and lead. M' is the metal used to form network bridging and represents aluminum or gallium and X represents S, Se or Te. A major problem with these glasses is that when X represents Te, the glass stability against crystallization is poor, making the drawing of optical fiber from these glasses very difficult.

Lucas et al in U.S. Pat. No. 5,352,639 teaches that tellurium and selenium halide-based glasses and optical fiber can be made with the following formula:

$$Te_w\,Se_y\,X_x\,Z_z \qquad (I)$$

where X represents at least one halogen selected from chlorine, bromine and iodine. Z represents at least one element selected from arsenic, antimony and bismuth. These glasses have sufficient stability against crystallization to permit drawing optical fiber, but they lack the ability to incorporate, or solubilize rare earth ions.

U.S. patent application entitled "Infrared Transparent Selenide Glasses" bearing Ser. No. 08/816,204 and filed Mar. 14, 1997, discloses a process for making selenide glasses and selenide glass compositions comprising at least 5 mol % alkaline earth selenide, 20–70 mol % germanium selenide, and 0.5–25 mol % Group IIIA selenide selected from gallium selenide, indium selenide and mixtures thereof. These glasses have demonstrated the solubility of rare earth ions, and are the longest wavelength IR transmitting chalcogenide glasses that would tolerate the addition of rare earth ions until the now disclosed telluride glasses.

OBJECTS AND SUMMARY OF INVENTION

It is an object of this invention to provide a telluride glass with improved solubility for rare earth ions, which transmits up to 20 microns, and which fluoresces when the glass contains a rare earth ion.

Another object of this invention is to provide a telluride glass without rare earth ions that has infrared transmission up to 20 microns and good transmission in optical fiber form in the 8 to 12 micron range.

These and other objects of the invention are attained by a telluride glass having composition, on mol basis, of 20–60% tellurium, 10–50% arsenic, 4–35% germanium, 0.5–15% gallium and/or indium, up to 15% iodine, up to 30% selenium and up to 5% rare earth.

DESCRIPTION OF PREFERRED EMBODIMENTS

Figure 1:
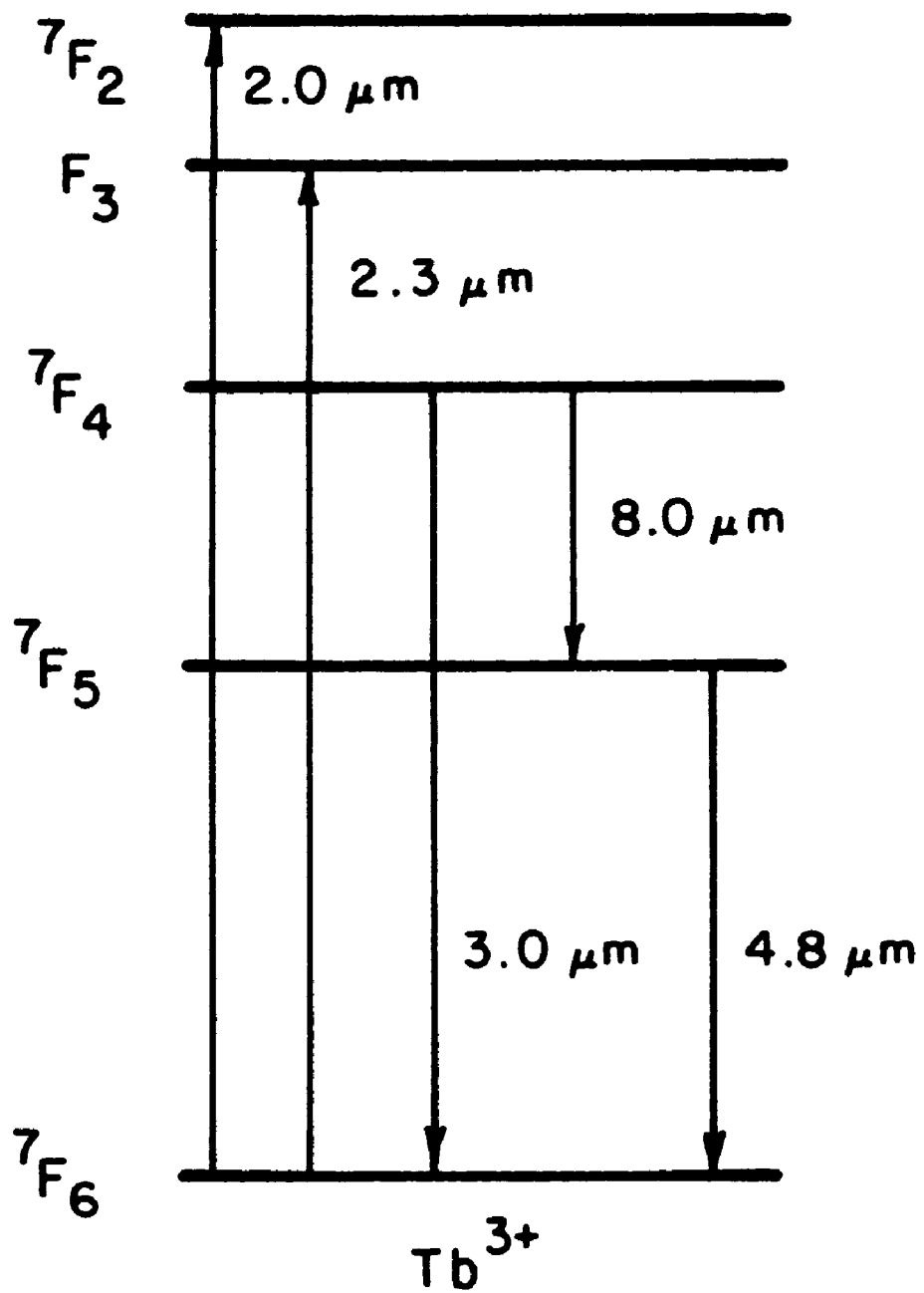
FIG. 1 is the energy level diagram for the trivalent terbium ion.

This invention pertains to a telluride glass which can solubilize rare earth ions, has high glass transition temperature, good glass stability against crystallization, and light transmission over a range of up to 20 microns.

The telluride glass of this invention contains tellurium, arsenic, germanium, gallium and/or indium, iodine optionally, and selenium optionally. The arsenic and germanium are network formers and tellurium forms primary bonds with arsenic and germanium ions. Iodine and selenium are minor additions or substitutions for tellurium.

Elemental glass components are typically used for the purpose of minimizing impurities, however, compounds of the elements can also be used.

Gallium and/or indium in the glass composition serve not only to solubilize the rare earths but also as glass network modifiers or intermediates.

Another embodiment of the telluride glass contains an optically active rare earth to provide the glass with optical activity. The presence of an optically active rare earth can result in stimulated emission of light and fluorescence in the mid infrared range. Preferred rare earths include terbium, praseodymium, neodymium, erbium, cerium, dysprosium, holmium, thulium, ytterbium, or mixtures of the rare earths to obtain the desired optical effect. The rare earths can be added to the glass batch in the form of elements, halide salts, chalcogenides and mixtures thereof. Lanthanum and gadolinium are rare earths but they are not optically active.

In the telluride glasses of this invention, on a molar basis of the components, amount of individual elements are given in Table 1, below:

TABLE 1

| Element | General Amount | Preferred Amount |
| --- | --- | --- |
| Tellurium | 20–60% | 30–50% |
| Arsenic | 10–50% | 25–40% |
| Germanium | 4–35% | 5–30% |
| Gallium | 0.5–15% | 2–10% |
| Iodine | 0–15% | 0–5% |
| Selenium | 0–30% | 0–15% |

Selenium can be substituted for tellurium in amount of up to 30 mol %. All or part of gallium can be substituted with indium. For solubility of rare earth ions, generally at least 20/1 on mol basis of indium or 10/1 amount of gallium to the rare earth concentration is required.

Based on the weight of the glass components, amount of a rare earth or a mixture thereof should be up to 5 weight %, preferably 0.01–1.0 weight % or 100 ppm to 10,000 ppm.

Halides are optional glass stabilizers in amounts up to 15%, larger amounts of chlorine, bromine and iodine make the glasses too hygroscopic.

Other traditional infrared glass forming components can also be present in the telluride glass provided that the other components do not substantially affect properties of the glass.

These rare earth doped telluride glasses are significantly more stable than prior art telluride glasses which crystallize readily on rare earth doping. Until now, there have been no rare earth doped telluride glasses in the literature. In addition to rare earth doping, these glasses can be prepared without rare earth ions to form a new family of glasses which are stable, can be fiberized and can transmit up to 20 microns.

For the telluride glasses of this invention, $T_g$ is greater than 150° C., more typically 180–250° C.; thermal stability $(T_x-T_g)$ is greater than 100° C., more typically 110–350° C., although telluride glasses of high stability have been made with no $T_x$ observed; and infrared transmission range is 1–20 microns, more typically 2–15 microns.

These telluride glasses have good rare earth solubility as evidenced by the fact that fluorescence is impaired unless the rare earth is rendered soluble in the glass. The presence of an optically active rare earth can result in stimulated emission of light and fluorescence in mid-IR range. The ability to solubilize an optically active rare earth ions gives the glass great utility in applications requiring fluorescence or stimulated emission of infrared light. The optical fiber made from the glass disclosed herein can be fluorescent which results from the optically active rare earth present therein.

The glass fiber of this invention can be made conventionally and can be of any cross-sectional shape. Typically, however, the fiber is circular in cross-section. Those of ordinary skill in the art can extrapolate that description when producing fiber having other cross-sectional shapes. The fiber can be of any length desired and is typically about 20–500 microns in diameter, taking into account only the core and cladding surrounding the core. The core is typically about 0.5–90% of the fiber diameter, or 0.1–450 microns, depending on whether it is single mode or multimode, with remainder being the cladding. The fiber loss is typically less than 5 dB/m, preferably less than 2 dB/m. In order to keep most of the transmitted light within the core, the refractive index of the core must be greater than refractive index of the cladding.

A process for improving physical and optical properties of the telluride glasses and the process for making telluride glasses of this invention includes the steps of batching the components of the desired telluride glass, melting the components to form molten glass, cooling the molten glass to solidify it and annealing the telluride glass to relieve internal stresses in the blank.

Batching of the components is done in a drybox maintained at less than about one ppm oxygen and water vapor and under an inert atmosphere. Highly purified components are used in order to enhance infrared transmission, especially mid-range infrared transmission range. It is preferable to use components in elemental form rather than in the form of salts or compounds, since this will yield a glass with a lower impurity level. All components can be purchased with the desired purity in excess of 99.999% on a metal basis. If a rare earth is used in the composition, it can be added as an elemental rare earth, as a rare earth chalcogenide, or as a rare earth halide.

After transferring the glass components into a quartz ampoule, the ampoule is taken from the drybox, evacuated to $<10^{-5}$ torr, and sealed. After sealing, the ampoule is heated to melt the contents. Typical melting schedules involve ramping the temperature from about room temperature to about 800 to 900° C. at a rate of about 1 to 10° C. per minute, then holding at about 800 to 900° C. for about ten to twenty hours. After heating to about 800 to 900° C., the contents are in a liquid state and are allowed to mix further by rocking the furnace to achieve a more uniform distribution within the molten glass.

After the melting process, the molten glass is quickly quenched from about 600–900° C. to about $T_g$ or below in order to solidify the glass. Annealing of the glass is accomplished after solidification by extended heating of the glass at slightly above $T_g$ in order to relieve stresses in the glass which may cause cracking/fracture of the glass blank. The glass is then characterized by powder x-ray diffraction and thermal analysis to confirm glass formation.

Principle application of the telluride glasses of this invention is in optical fibers. Due to its enhanced stability and extended transmission in the infrared region, the glass of this invention can be used to make optical fibers for use in infrared sensors. Due to the extended transmission range in the infrared region, infrared sensors made using the novel telluride glass optical fibers of this invention are capable of detecting more chemical species than prior art sulfide or selenide glasses.

Another important application for the glasses of this invention is in doped optical fiber sources wherein the telluride glass is doped with a rare earth ion. Under appropriate conditions, these rare earths can fluoresce or produce stimulated emission, allowing the doped telluride fibers to be used as sources, lasers or optical amplifiers. These telluride glasses are better laser, amplifier, and phosphor source materials because the optically active rare earth ions have superior solubility in the telluride glasses. Also, the glasses have lower phonon energies than other chalcogenide glasses based upon S or Se resulting in higher probability of radiative emission and the potential for longer excited state lifetimes and higher quantum efficiencies.

Glass fibers made from telluride glasses can also be used in $CO_2$ laser power transmission and in medical and industrial applications, such as imaging bundles for the 8–12 micron region.

When a rare earth element is added to the modified telluride glass host, longer wavelength emission occurs than with any other known glass host material. This event is demonstrated from the energy level diagram of FIG. 1 for terbium measured in the telluride glass for which additional parameters are given in Table 2, below:

TABLE 2

| Transition | λ(μm) | A (s$^{-1}$) | β | σ$_{SE}$ (×10$^{-20}$ cm$^2$)* |
|---|---|---|---|---|
| $^7F_5$ => $^7F_6$ | 4.8 | 81.2 | 1 | 1.1 |
| $^7F_4$ => $^7F_6$ | 3.0 | 184.5 | 0.92 | 1.0 |
| $^7F_4$ => $^7F_5$ | 8.0 | 16.8 | 0.08 | 0.6 |
| $^7F_3$ => $^7F_6$ | 2.3 | 228.5 | 0.75 | 0.7 |
| $^7F_3$ => $^7F_5$ | 4.5 | 68.8 | 0.22 | 0.8 |
| $^7F_3$ => $^7F_4$ | 10.2 | 7.5 | 0.03 | 0.4 |

*Estimated using 300 cm$^{-1}$ as the effective linewidth

Table 2, above, shows emission of 8.0 micron light from the $^7F_4$ level to the $^7F_5$ level. Although emission of the 8.0 micron light was not detectable due to the small branching ratio, β, of the transition, and the limits of the detection system, the fact that light at 3 microns from the $^7F_4$⇒$^7F_6$ transition is observed indicates that the $^7F_4$ level is active and radiates, and consequently, 8 micron light is present, albeit weak in intensity. The relatively weak intensity of the 8 micron light may preclude the use of the terbium doped telluride glasses as fluorescent sources in this region but, this does not exclude the use of this transition for a laser to produce a bright source in the 8–12 micron region.

The invention having been generally described, the following examples are given as particular embodiments of the invention to demonstrate the practice and advantages thereof. It is understood that the examples are given by way of illustration and are not intended to limit in any manner the specification or the claims that follow.

EXAMPLE 1

This example demonstrates preparation of the doped telluride glass of sample #2, in Table 3.

Elemental components, given in mol percent below, were batched in a drybox containing less than 1 ppm oxygen and less than 0.01 ppm water vapor.

| Elemental Components of Sample #3 | |
|---|---|
| Tellurium (Te) | 45.4% |
| Arsenic (As) | 40.5% |
| Germanium (Ge) | 9.1% |
| Gallium (Ga) | 5.0% |
| Terbium (Tb) | 3000 ppm |

A ten-gram sample of composition Te$_{45.4}$ As$_{40.5}$ Ge$_{9.1}$ Ga$_{5.0}$ doped with the addition of 3000 ppm terbium was placed into a silica ampoule which was evacuated to <10-5 torr and sealed off. In weight percent, the composition was Te$_{58.90}$ As$_{30.84}$ Ge$_{6.72}$ Ga$_{3.54}$ with 3000 ppm terbium. Elements tellurium and arsenic were purified by vacuum distillation to greater than 99.999% purity while germanium and gallium were 99.999% pure as received and required no further purification.

The ampoule was then heated to about 800° C. at a rate of about 200° C./hr, held at 800° C. for 18 hours, cooled to 650° C., quenched in air for 2 minutes, dipped in water for 1–2 seconds, and subsequently annealed at 200° C. for 2 hours. The glass rod so obtained was analyzed by differential scanning calorimetry for determination of thermal properties, glass transition temperature (T$_g$) and crystallization temperature (T$_x$) using a heating rate of 10° C./min.

Figure 2:
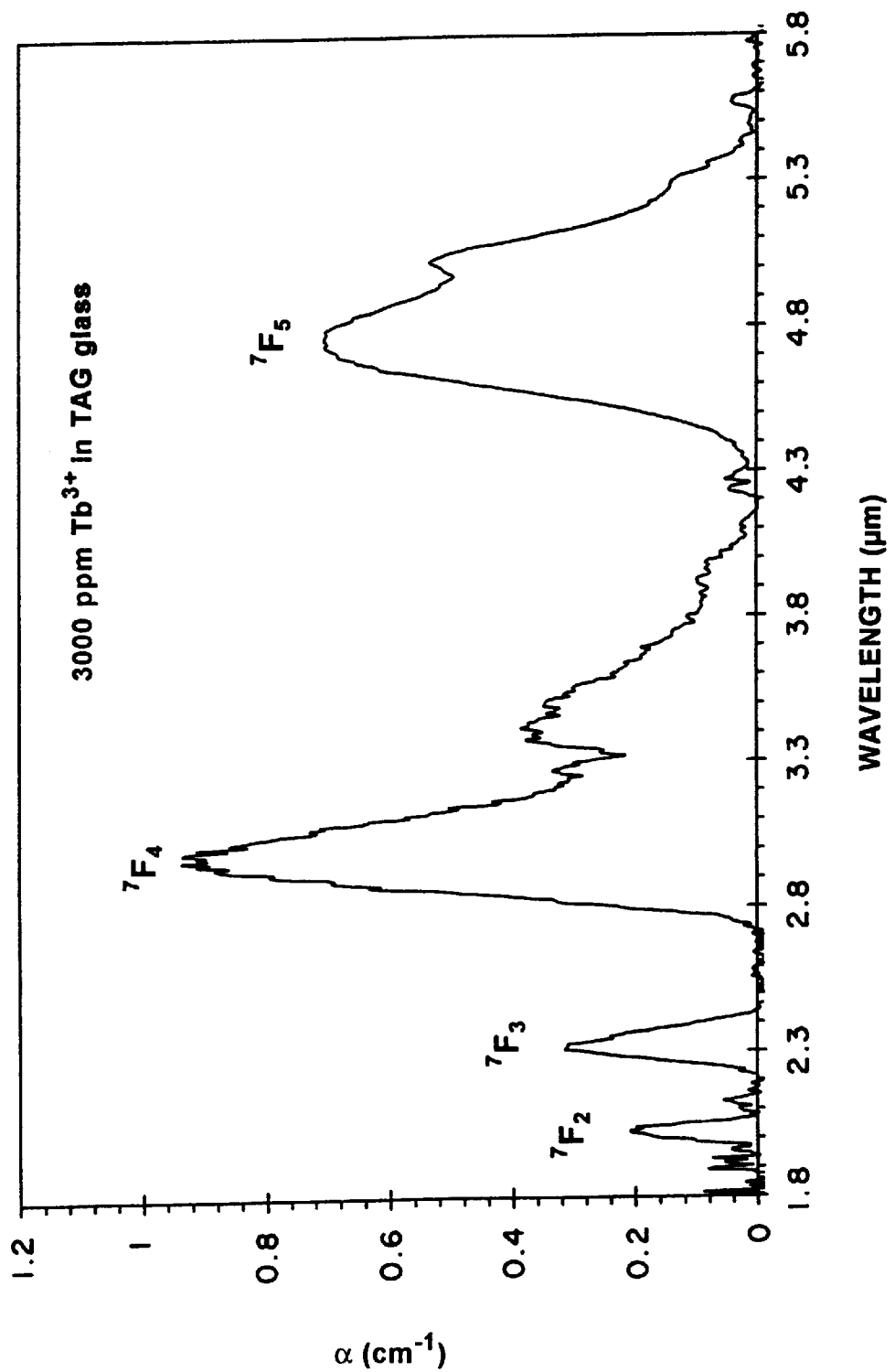
FIG. 2 is a plot of Absorption versus Wavelength of a glass sample #2 in Table 2 containing 3000 ppm terbium.
Figure 3:
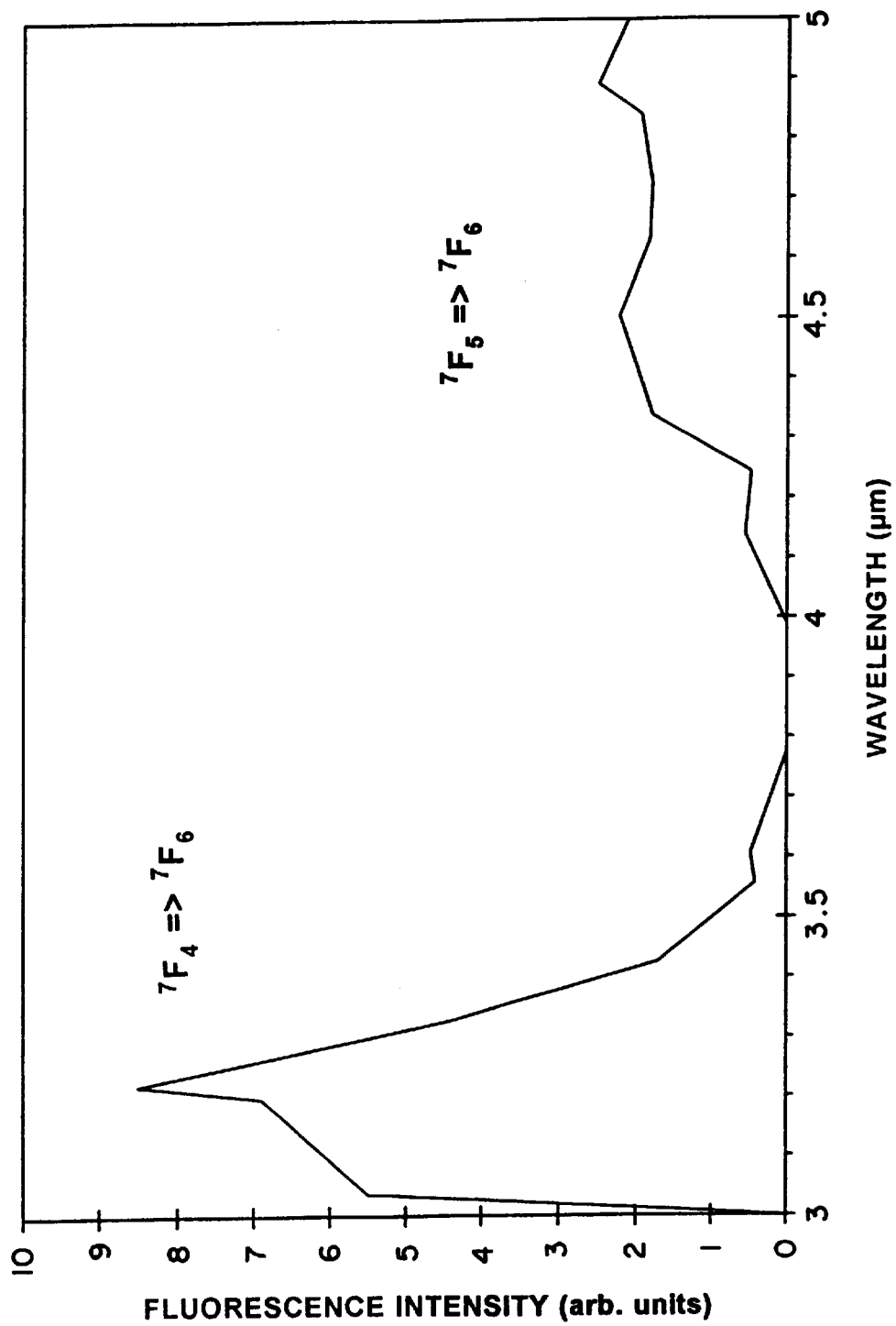
FIG. 3 is a plot of Fluorescence Intensity versus Wavelength in the 3–5 micron region for the glass sample #2 containing 3000 ppm terbium.
Figure 4:
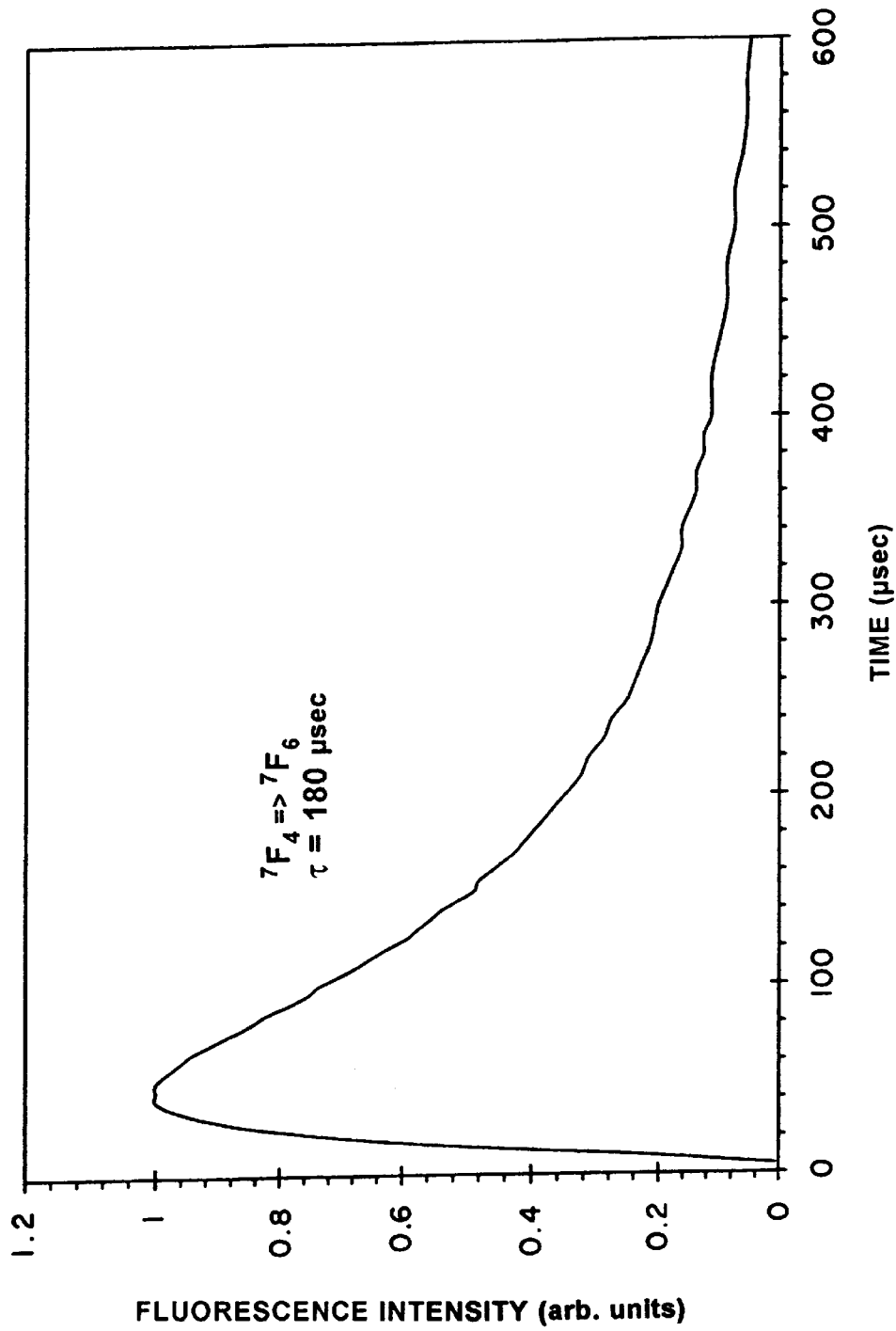
FIG. 4 is a plot of Fluorescence Intensity versus Time for glass sample #2 containing 3000 ppm terbium for $^7F_4 \rightarrow {}^7F_6$ transition pumped with 2.0 micron light showing a decay lifetime of 180 microseconds.

The glass transition temperature was determined to be 192° C. and no crystallization was observed up to 600° C. Then sections of 2–3 mm of the telluride glass were cut and polished and then absorption and IR emission spectra were recorded as shown in FIGS. 2–4.

As shown in FIG. 1, under appropriate pumping, terbium emits 4.8 micron fluorescence from the $^7F_5$⇒$^7F_6$ transition, 3.0 micron fluorescence from the $^7F_4$⇒$^7F_6$ transition and 8.0-micron fluorescence from the $^7F_4$⇒$^7F_5$ transition. Terbium also has strong absorption lines at 2.0 microns, 2.3 microns and 3.0 microns, as shown in FIG. 2, suitable for pumping the 8.0 micron $^7F_4$⇒$^7F_5$ transition. FIG. 3 shows the fluorescence spectrum of terbium in telluride glass between 3 and 5 microns resulting from a pump source operating at 2 microns. The $^7F_4$⇒$^7F_6$ emission peaks at approximately 3.2 microns, while the $^7F_5$⇒$^7F_6$ emission peaks near 4.5 microns. FIG. 4 shows the fluorescence lifetime of the $^7F_4$⇒$^7F_6$ near 3.0 microns. The lifetime is 180 microseconds. Such a long lifetime indicates that the $^7F_4$ level is active in the telluride glass host and capable of emitting light radiatively from the $^7F_4$⇒$^7F_6$ 3 micron transition and the $^7F_4$⇒$^7F_5$ 8 micron transition.

Other samples of telluride glasses were prepared and tested as described above. Summary thereof is given in Table 3, below:

TABLE 3

| Sample | Te | As | Ge | Ga | In | I | RE ppm | Se | T$_g$ (° C.) | T$_x$ (° C.) | IR (% T) |
|---|---|---|---|---|---|---|---|---|---|---|---|
| 1 | 45.4 | 40.5 | 9.1 | 5 | 0 | 0 | 900 Pr | 0 | 189 | None | No |
| 2 | 45.4 | 40.5 | 9.1 | 5 | 0 | 0 | 3000 Tb | 0 | 192 | None | Yes |
| 3 | 45.4 | 36 | 9.1 | 10 | 0 | 0 | 1000 Tb | 0 | 219 | 358 | Yes |
| 4 | 45.4 | 31 | 9.1 | 15 | 0 | 0 | 1000 Tb | 0 | 210 | 342 | No |
| 5 | 45.4 | 46 | 4.1 | 5 | 0 | 0 | 1000 Tb | 0 | 177 | 315 | No |
| 6 | 43 | 39 | 13 | 4.7 | 0 | 0 | 1000 Tb | 0 | 200 | 320 | Yes |
| 7 | 35 | 40 | 10 | 5 | 0 | 10 | 1500 Tb | 0 | 196 | 458 | Yes |
| 8 | 39.5 | 40 | 15 | 0.5 | 0 | 5 | 1000 Tb | 0 | 176 | 476 | Yes |
| 9 | 40 | 40.5 | 9.1 | 5 | 0 | 0 | 1100 Tb | 5 | 160 | None | Yes |
| 10 | 45.4 | 40.5 | 9.1 | 0 | 5 | 0 | 1000 Tb | 0 | 204 | 316 | Yes |
| 11 | 35 | 40 | 10 | 0 | 5 | 10 | 1000 Tb | 0 | 191 | 440 | Yes |
| 12 | 35 | 40 | 10 | 0 | 5 | 5 | 1000 Tb | 5 | 197 | 511 | Yes |
| 13 | 35 | 40 | 13 | 2 | 05 | 10 | 1000 Tb | 0 | 196 | 427 | Yes |

TABLE 3-continued

| Sample | Te | As | Ge | Ga | In | I | RE ppm | Se | $T_g$ (°C.) | $T_x$ (°C.) | IR (% T) |
|---|---|---|---|---|---|---|---|---|---|---|---|
| 14 | 35 | 40 | 15 | 0.5 | 0 | 10 | 2100 Tb | 0 | 174 | 391 | Yes |
| 15 | 35 | 40 | 14.5 | 0 | 0.5 | 10 | 2600 Tb | 0 | 190 | 417 | Yes |
| 16 | 35 | 35 | 10 | 5 | 0 | 10 | 0 | 5 | 183 | 487 | Yes |
| 17 | 40 | 35 | 15 | 2 | 0 | 0 | 2800 Pr | 7 | 190 | 367 | Yes |
| 18 | 40 | 35 | 15 | 2 | 0 | 0 | 4000 Pr | 7 | 201 | 323 | Yes |
| 19 | 80 | 3 Sb | 15 | 2 | 0 | 0 | 4000 Pr | 0 | | | No |
| 20 | 40 | 35 | 15 | 5 | 0 | 0 | 2100 Pr | 5 | 214 | 360 | Yes |
| 21 | 35 | 35 | 15 | 5 | 0 | 0 | 2833 Pr | 10 | 219 | 335 | Yes |
| 22 | 40 | 30 | 15 | 5 | 0 | 5 | 1000 Nd | 5 | 211 | 440 | Yes |
| 23 | 40 | 30 | 15 | 5 | 0 | 0 | 3100 Pr | 10 | 211 | 321 | Yes |

Samples lacking IR trasmission contained crystals as determined by x-ray diffraction.

EXAMPLE 2

This example demonstrates drawing a glass fiber from the glass of this invention. The apparatus used to draw the fiber is disclosed in patent application bearing the docket number NC 76,989, identified more specifically earlier.

A 30-gram glass rod 1 cm in diameter and 7 cm long was prepared from the same composition and melting conditions as the glass given in Example 1, above. The rod was drawn into fiber by heating the rod to 315° C., corresponding to a viscosity of about $10^{5.5}$ poise. This uncladded or core only fiber with diameter of 140 microns, was drawn at a rate of about 2 meters per minute. A total of 22 meters of the fiber was drawn. The minimal loss for a section of the fiber drawn from this glass rod measured approximately 1.4 dB/m at a wavelength of 8.8 microns.

While presently preferred embodiments have been shown of the novel telluride glasses, and of the several modifications discussed, persons skilled in this art will readily appreciate that various additional changes and modifications may be made without departing from the spirit of the invention as defined and differentiated by the following claims.

We claim:

1. A glass comprising, on a mol basis, 20%–60% tellurium, 10–50% arsenic, 4–35% germanium, 0.5–15% gallium, up to 15% iodine, and up to 30% selenium, and wherein up to the entire amount of gallium is substituted with indium.

2. The glass of claim 1 further comprising up to 5%, based on the total weight of components used to make the glass, of a rare earth or a mixture of rare earths.

3. The glass of claim 1 further comprising 0.01–1.0%, based on the total weight of components used to make the glass, of a rare earth or a mixture of rare earths.

4. The glass of claim 1 wherein amount of tellurium is 30–50%, amount of arsenic is 25–40%, amount of germanium is 5–30%, amount of gallium is 2–10%, amount of iodine is up to 5%, and amount of selenium is up to 15%.

5. The glass of claim 4 further comprising up to 5%, based on the total weight of components used to make the glass, of a rare earth or a mixture of rare earths, said glass has transition temperature, $T_g$, above 150° C., and the difference between $T_g$ and crystallization tempehasrature, $T_x$, is above 100° C.

6. The glass of claim 4 doped with 0.01–1.0%, based on the weight of components used to make the glass, of a rare earth or a mixture of rare earths, said glass has $T_g$ of 180–250° C., $T_x$–$T_g$ of 110–350° C., and infrared transmission in the region is 1 to 20 microns.

7. The glass of claim 6 wherein the rare earth is selected from the group consisting of praseodymium, terbium, neodymium, dysprosium, erbium, ytterbium, holmium, thulium, cerium, and mixtures thereof.

8. A telluride glass free of crystallites comprising, on mol basis, 20%–60% tellurium, 10–50% arsenic, 4–35% germanium, 0.5–15% gallium, up to 15% iodine, and up to 30% selenium, and wherein up to the entire amount of gallium is substituted with indium.

9. The glass of claim 8 comprising up to 5%, based on the total weight of components used to make the glass, of a rare earth or a mixture of rare earths.

10. The glass of claim 8 containing 0.01–1.0%, based on the weight of components used to make the glass, of a rare earth or a mixture of rare earths.

11. The glass of claims 8 wherein amount of tellurium is 30–50%, amount of arsenic is 35–45%, amount of germanium is 5–10%, amount of gallium is 1–10%, amount of iodine is up to 5%, and amount of selenium is up to 5%.

12. The glass of claim 11 doped with up to 5%, based on the weight of components used to make the glass, of a rare earth or a mixture of rare earths.

13. The glass of claim 11 doped with 0.01–1.0%, based on the weight of components used to make the glass, of a rare earth or a mixture of rare earths.

14. The glass of claim 13 wherein the rare earth is selected from the group consisting of praseodymium, terbium, neodymium, dysprosium, erbium, ytterbium, holmium, thulium, cerium, and mixtures thereof.

15. The glass of claim 11 having glass transition temperature above 150° C., difference between $T_g$ and crystallization temperature $T_x$ is above 200° C., and infrared transmission of 1–20 microns.

16. A glass fiber made from glass comprising, on a mol basis, 20%–60% tellurium, 10–50% arsenic, 4–35% germanium, 0.5–15% gallium, up to 15% iodine, and up to 30% selenium, and wherein up to the entire amount of gallium is substituted with indium.

17. The glass fiber of claim 16 having optical loss of less than 5 dB/m and doped with up 5%, based on the weight of components used to make the glass, of a rare earth or a mixture of rare earths.

18. The glass fiber of claim 16 wherein amount of tellurium is 30–50%, amount of arsenic is 25–40%, amount of germanium is 5–30%, amount of gallium is 2–10%, amount of iodine is up to 5%, and amount of selenium is up to 15%.

19. The glass fiber of claim 18 having a core of a diameter of 0.1–450 microns comprising up to 5%, based on the total weight of components used to make the glass, of a rare earth or a mixture of rare earths, said glass has transition temperature, $T_g$, above 150° C., and the difference between $T_g$ and crystallization temperature, $T_x$, is above 100° C., wherein the rare earth is selected from the group consisting of praseodymium, terbium, neodymium, dysprosium, erbium, ytterbium, holmium, thulium, cerium, and mixtures thereof.

20. The glass fiber of claim 18 having optical loss of less than 2 dB/m comprising 0.01–1.0%, based on the total weight of components used to make the glass, of a rare earth or a mixture of rare earths, said glass has $T_g$ of 180–250° C., $T_x$–$T_g$ of 110–350° C., and infrared transmission in the region of 1–20 microns.

* * * * *